United States Patent
Wu

(10) Patent No.: US 10,855,399 B2
(45) Date of Patent: Dec. 1, 2020

(54) DEVICE AND METHOD OF HANDLING DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/610,632

(22) Filed: Jun. 1, 2017

(65) Prior Publication Data
US 2017/0353987 A1   Dec. 7, 2017

Related U.S. Application Data

(60) Provisional application No. 62/345,010, filed on Jun. 3, 2016.

(51) Int. Cl.
*H04L 1/00* (2006.01)
*H04W 76/15* (2018.01)
(Continued)

(52) U.S. Cl.
CPC ............ *H04L 1/0057* (2013.01); *H04W 8/26* (2013.01); *H04W 56/002* (2013.01); *H04W 72/042* (2013.01); *H04W 76/15* (2018.02)

(58) Field of Classification Search
CPC ..... H04W 76/025; H04W 76/15; H04W 8/26; H04W 56/002; H04W 72/042; H04L 1/0057
(Continued)

(56) References Cited

U.S. PATENT DOCUMENTS

2011/0250892 A1   10/2011 Gupta
2014/0194126 A1*   7/2014 Tsuboi ............ H04W 36/0072
455/437
(Continued)

FOREIGN PATENT DOCUMENTS

CN   104919735 A   9/2015
TW   201101895 A1   1/2011
(Continued)

OTHER PUBLICATIONS

3GPP TS 36.331 V13.1.0 (Mar. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13).
(Continued)

*Primary Examiner* — Chi Tang P Cheng
(74) *Attorney, Agent, or Firm* — Winston Hsu

(57) ABSTRACT

A communication device comprises a storage device for storing instructions of receiving a radio resource control (RRC) message via a RRC connection on a first cell from a first BS, wherein the RRC message configures a secondary cell group (SCG) configuration to the communication device; synchronizing to a downlink (DL) of a second cell indicated in the SCG configuration, wherein the second cell belongs to a second BS; transmitting a RRC complete message to the first cell or a third cell of the first BS in response to the RRC message without performing a random access (RA) procedure to the second cell, if the RRC message indicates no need to perform the RA procedure to the second cell; and determining that the SCG configuration is successfully configured, when detecting a Radio Network Temporary Identifier (RNTI) on a DL channel from the second cell in a first time period.

17 Claims, 4 Drawing Sheets

(51) Int. Cl.
  *H04W 8/26* (2009.01)
  *H04W 56/00* (2009.01)
  *H04W 72/04* (2009.01)

(58) Field of Classification Search
  USPC .......................................................... 370/329
  See application file for complete search history.

(56) References Cited

U.S. PATENT DOCUMENTS

| | | | |
|---|---|---|---|
| 2015/0043490 A1* | 2/2015 | Wu | H04W 8/26 370/329 |
| 2015/0139140 A1 | 5/2015 | Dinan | |
| 2015/0173047 A1 | 6/2015 | Yamada | |
| 2015/0173120 A1* | 6/2015 | Yamada | H04W 36/0072 370/331 |

FOREIGN PATENT DOCUMENTS

| | | |
|---|---|---|
| TW | 201543931 A | 11/2015 |
| WO | 20151062043 A1 | 5/2015 |

OTHER PUBLICATIONS

3GPP TS 36.133 V13.3.0 (Mar. 2016) Technical Specification 3rd Generation Partnership Project; Technical Specification Group Radio Access Network; Evolved Universal Terrestrial Radio Access (E-UTRA); Requirements for support of radio resource management (Release 13), pp. 48-363.
Search Report dated Nov. 14, 2017 for EP application No. 17173953.5, p. 1.
Office action dated Jan. 2, 2018 for the Taiwan application No. 106118385, filed Jun. 3, 2017, p. 1-8.
Search Report dated Nov. 14, 2017 for EP application No. 17173953.5, pp. 1-7.
Office action dated Feb. 3, 2020 for the China application No. 201710409855.3, filing date Jun. 2, 2017, pp. 1-9.

* cited by examiner

DEVICE AND METHOD OF HANDLING DUAL CONNECTIVITY

CROSS REFERENCE TO RELATED APPLICATIONS

This application claims the benefit of U.S. Provisional Application No. 62/345,010 filed on Jun. 3, 2016, which is incorporated herein by reference.

BACKGROUND OF THE INVENTION

1. Field of the Invention

The present invention relates to a device and a method used in a wireless communication system, and more particularly, to a device and a method of handling dual connectivity.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include a mobility management and a Quality of Service (QoS) control for the UE.

SUMMARY OF THE INVENTION

The present invention therefore provides a communication device and method for handling dual connectivity to solve the abovementioned problem.

A communication device for handling dual connectivity comprises a storage device for storing instructions and a processing circuit coupled to the storage device. The processing circuit is configured to execute the instructions stored in the storage device. The instructions comprise being configured a radio resource control (RRC) connection with a first cell by a first base station (BS); receiving a RRC message via the RRC connection on the first cell from the first BS, wherein the RRC message configures a secondary cell group (SCG) configuration to the communication device; synchronizing to a downlink (DL) of a second cell indicated in the SCG configuration, wherein the second cell belongs to a second BS; transmitting a RRC complete message to the first cell or a third cell of the first BS in response to the RRC message without performing a random access (RA) procedure to the second cell, if the RRC message indicates no need to perform the RA procedure to the second cell; and determining that the SCG configuration is successfully configured, when detecting a Radio Network Temporary Identifier (RNTI) on a DL channel from the second cell in a first time period.

A communication device for handling dual connectivity comprises a storage device for storing instructions and a processing circuit coupled to the storage device. The processing circuit is configured to execute the instructions stored in the storage device. The instructions comprise being configured a radio resource control (RRC) connection with a first cell by a first base station (BS); receiving a RRC message via the RRC connection on the first cell from the first BS, wherein the RRC message configures a secondary cell group (SCG) configuration to the communication device; synchronizing to a downlink (DL) of a second cell indicated in the SCG configuration, wherein the second cell belongs to a second BS; transmitting a RRC complete message to the first cell or a third cell of the first BS in response to the RRC message without performing a random access (RA) procedure to the second cell, if the RRC message indicates no need to perform the RA procedure to the second cell; and determining that the SCG configuration is successfully configured, when the synchronization to the DL of the second cell is completed in a first time period.

A method for handling dual connectivity for a communication device comprises being configured a radio resource control (RRC) connection with a first cell by a first base station (BS); receiving a RRC message via the RRC connection on the first cell from the first BS, wherein the RRC message configures a secondary cell group (SCG) configuration to the communication device; synchronizing to a downlink (DL) of a second cell indicated in the SCG configuration, wherein the second cell belongs to a second BS; transmitting a RRC complete message to the first cell or a third cell of the first BS in response to the RRC message without performing a random access (RA) procedure to the second cell, if the RRC message indicates no need to perform the RA procedure to the second cell; and determining that the SCG configuration is successfully configured, when detecting a Radio Network Temporary Identifier (RNTI) on a DL channel from the second cell in a first time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
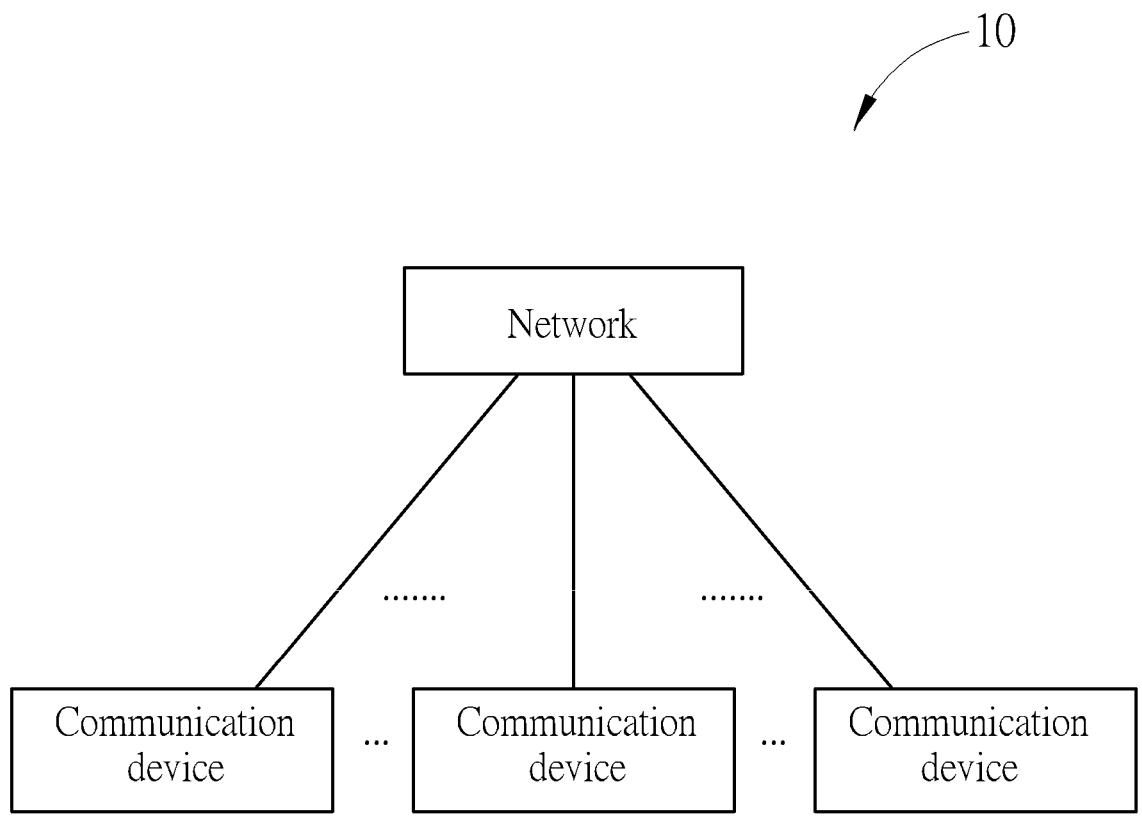
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device communicate with each other via one or more cells on one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD).

In FIG. 1, the network and the communication devices are simply utilized for illustrating the structure of the wireless communication system 10. The network may include a radio access network (RAN) including at least one base station (BS). Practically, the RAN may be an evolved universal terrestrial radio access network (E-UTRAN) including at least one evolved Node-B (eNB). The RAN may be a fifth generation (5G) network including at least one 5G BS (e.g., gNB) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS. Furthermore, the network may also include a core network, wherein the core network may include network entities connecting to the RAN.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
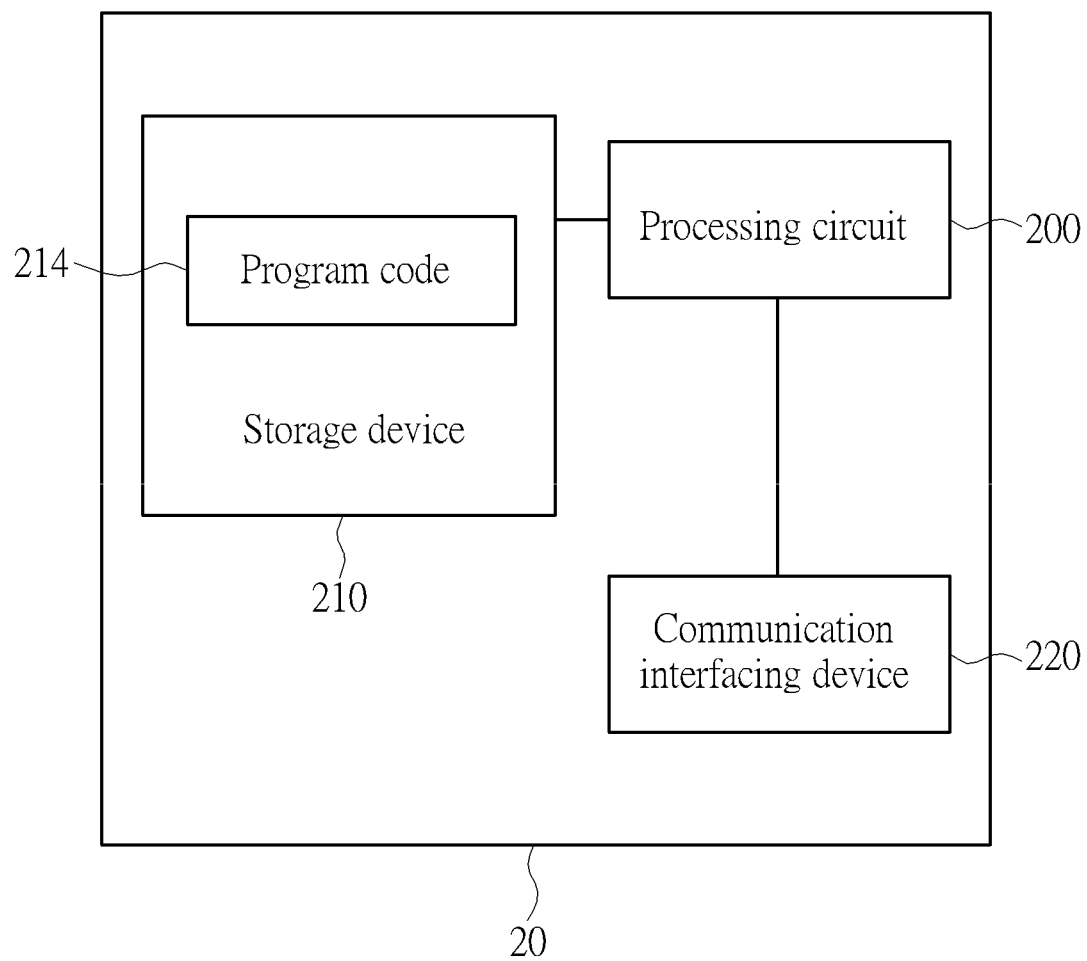
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
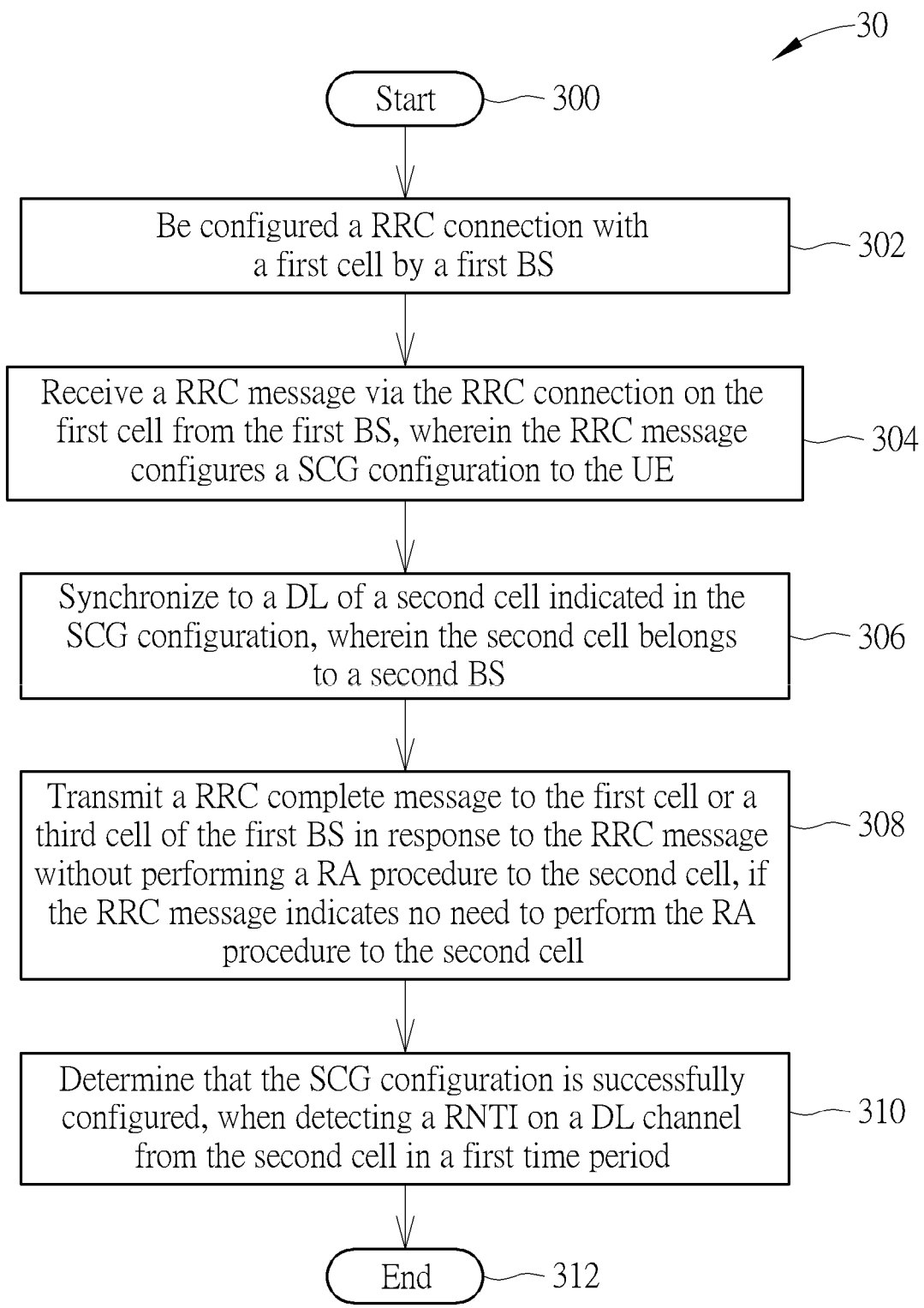
FIG. 3 is a flowchart of a process according to an example of the present invention.

FIG. 3 is a flowchart of a process 30 according to an example of the present invention. The process 30 is utilized in a UE, to handle dual connectivity. The process 30 includes the following steps:

Step 300: Start.

Step 302: Be configured a radio resource control (RRC) connection with a first cell by a first BS.

Step 304: Receive a RRC message via the RRC connection on the first cell from the first BS, wherein the RRC message configures a secondary cell group (SCG) configuration to the UE.

Step 306: Synchronize to a DL of a second cell indicated in the SCG configuration, wherein the second cell belongs to a second BS.

Step 308: Transmit a RRC complete message to the first cell or a third cell of the first BS in response to the RRC message without performing a random access (RA) procedure to the second cell, if the RRC message indicates no need to perform the RA procedure to the second cell.

Step 310: Determine that the SCG configuration is successfully configured, when detecting a Radio Network Temporary Identifier (RNTI) on a DL channel from the second cell in a first time period.

Step 312: End.

According to the process 30, the UE is configured a RRC connection with a first cell by a first BS (e.g., of the network in FIG. 1). The UE receives a RRC message via the RRC connection on the first cell from the first BS, wherein the RRC message configures a SCG configuration to the UE. Accordingly, the UE synchronizes to a DL of a second cell indicated in the SCG configuration, wherein the second cell belongs to a second BS (e.g., of the network in FIG. 1). The UE transmits a RRC complete message to the first cell or a third cell of the first BS in response to the RRC message without performing a RA procedure to the second cell, if the RRC messages indicates (e.g., orders, instructs) no need to perform the RA procedure to the second cell. The UE determines that the SCG configuration is successfully configured, when detecting a RNTI on a DL channel from the second cell in a first time period. That is, whether the SCG configuration is successfully configured is determined according to whether the RNTI is detected.

Realization of the process 30 is not limited to the above description. The following examples may be applied to the process 30.

In one example, the UE starts a first timer (e.g., T307) for determining whether the first time period is exceeded, when receiving the RRC message. The UE stops the first timer, when detecting the RNTI on the DL channel from the second cell before the first timer expires. That is, the UE uses the first timer for counting the first time period.

In one example, the UE determines that the SCG configuration is not successfully configured (i.e., SCG change failure occurs), when the UE does not detect the RNTI from the second cell in the first time period. For example, the UE determines that the SCG change failure occurs, when the first timer expires.

In one example, the UE detects the RNTI on the DL channel by detecting a resource allocation (e.g., DL control information (DCI)) with a cyclic redundancy check (CRC) scrambled by the RNTI on the DL channel. Further, the resource allocation may include an uplink (UL) grant or a DL assignment.

In one example, the DL channel is a physical DL control channel (PDCCH) or an enhanced PDCCH (E-PDCCH). In one example, the RNTI is a cell RNTI (C-RNTI) of the UE or a system information RNTI (SI-RNTI). The C-RNTI may be included in the SCG configuration.

Figure 4:
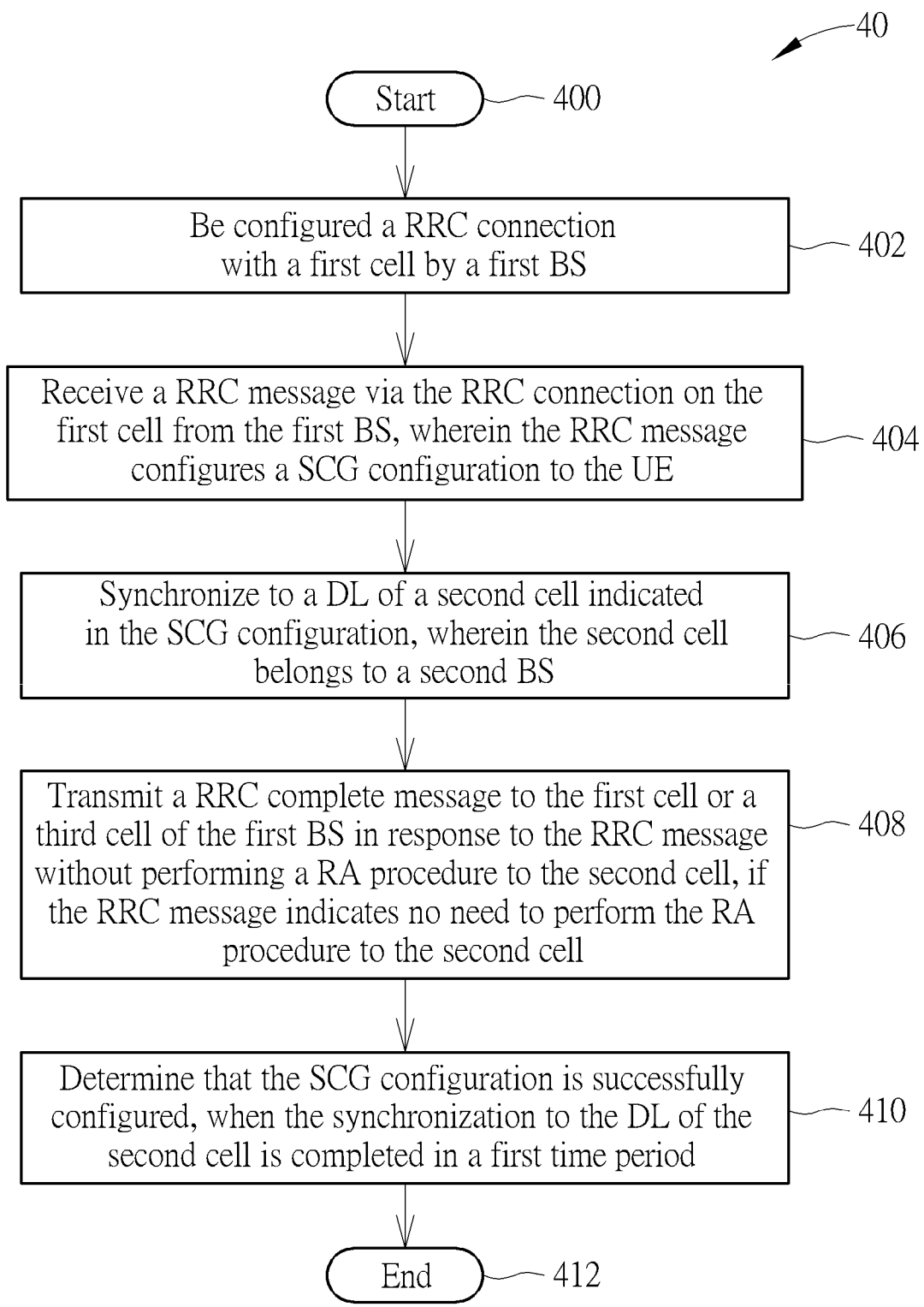
FIG. 4 is a flowchart of a process according to an example of the present invention.

FIG. 4 is a flowchart of a process 40 according to an example of the present invention. The process 40 is utilized in a UE, to handle dual connectivity. The process 40 includes the following steps:

Step 400: Start.

Step 402: Be configured a RRC connection with a first cell by a first BS.

Step 404: Receive a RRC message via the RRC connection on the first cell from the first BS, wherein the RRC message configures a SCG configuration to the UE.

Step 406: Synchronize to a DL of a second cell indicated in the SCG configuration, wherein the second cell belongs to a second BS.

Step 408: Transmit a RRC complete message to the first cell or a third cell of the first BS in response to the RRC message without performing a RA procedure to the second cell, if the RRC message indicates no need to perform the RA procedure to the second cell.

Step 410: Determine that the SCG configuration is successfully configured, when the synchronization to the DL of the second cell is completed in a first time period.

Step 412: End.

According to the process 40, the UE is configured a RRC connection with a first cell by a first BS (e.g., of the network in FIG. 1). The UE receives a RRC message via the RRC connection on the first cell from the first BS, wherein the RRC message configures a SCG configuration to the UE. Accordingly, the UE synchronizes to a DL of a second cell indicated in the SCG configuration, wherein the second cell belongs to a second BS (e.g., of the network in FIG. 1). The UE transmits a RRC complete message to the first cell or a third cell of the first BS in response to the RRC message without performing a RA procedure to the second cell, if the RRC messages indicates (e.g., orders, instructs) no need to perform the RA procedure to the second cell. The UE determines that the SCG configuration is successfully configured, when the synchronization to the DL of the second cell is completed in a first time period. That is, whether the SCG configuration is successfully configured is determined according to whether the synchronization to the DL of the second cell is completed in the first time period.

Realization of the process 40 is not limited to the above description. The following examples may be applied to the process 40.

In one example, the UE starts a first timer (e.g., T307) for determining whether the first time period is exceeded, when receiving the RRC message. The UE stops the first timer, when the synchronization to the DL of the second cell is completed before the first timer expires. That is, the UE uses the first timer for counting the first time period.

In one example, the UE determines that the SCG configuration is not successfully configured (i.e., SCG change failure occurs), when the synchronization to the DL of the second cell is not completed in the first time period. For example, the UE determines that the SCG change failure occurs, when the first timer expires.

The following examples may be applied to any of the processes 30-40.

In one example, when/after determining that the SCG configuration is successfully configured, the UE considers an out-of-sync indication for the second cell as valid. That is, the UE does not consider the out-of-sync indication as valid within the first time period to avoid that the UE determines that a radio link failure occurs before the SCG configuration is successfully configured.

In one example, the first BS may be an LTE eNB or a 5G BS. The second BS may be an LTE eNB or a 5G BS.

In one example, the UE is configured with a data radio bearer (DRB) which is a split bearer or a SCG bearer in the SCG configuration or the RRC message. In one example, the UE adds the SCG (e.g., SeNB addition) according to the SCG configuration. In one example, the UE changes a SCG (e.g., SCG change or SeNB change) according to the SCG configuration. After successfully configuring the SCG configuration, the UE simultaneously connects to the first BS and the second BS, i.e., the UE is in dual connectivity.

In one example, the UE synchronizing to the DL of the second cell includes synchronizing to at least one synchronization signal (e.g., primary synchronization signal (PSS), secondary synchronization signal (SSS), reference signal (RS)). The RS may be a channel state information RS, a cell-specific RS or a discovery RS.

In one example, the SCG configuration may include a RA configuration. The RA configuration may include at least one of a common RA channel (RACH) configuration (e.g., RACH-ConfigCommon), a dedicated RACH configuration (e.g., RACH-ConfigDedicated) and a physical RA channel (PRACH) configuration (e.g., PRACH-Config). The RRC message or the SCG configuration may include an indication indicating no need to perform the RA procedure to configure the SCG configuration. That is, the RA procedure is not required for configuring the SCG configuration, and the UE does not perform the RA procedure according to the RA configuration. In another example, the SCG configuration does not include any RA configuration. According to the examples above, the UE knows that the first BS configures it to not to perform the RA procedure.

In one example, the UE performs the RA procedure to the second cell, when not detecting a cell RNTI (C-RNTI) of the UE on a DL channel from the second cell within a second time period. The second time period may be shorter than the first time period. In one example, the UE may start a second timer for counting the second time period. When/after the second timer expires, the UE performs the RA procedure.

In one example, the UE may transmit a scheduling request (SR) to the second cell, when not detecting a C-RNTI of the UE on a DL channel from the second cell within the second time period. The second time period may be shorter than the first time period. In one example, the UE may start a second timer for counting the second time period. When/after the second timer expires, the UE transmits the SR.

In one example, the UE performs the RA procedure to the second cell, if/when the RRC message or the SCG configuration indicates that the RA procedure is required. For example, the RRC message or the SCG configuration includes the RA configuration, and does not include the indication indicating no need to perform the RA procedure. The UE successfully configures the SCG configuration and stops the first timer (and/or the second timer), when successfully completing the RA procedure. When the UE does not successfully complete the RA procedure and the first timer expires, the UE determines the SCG change failure occurs.

In one example, when the SCG change failure occurs, the UE initiates a SCG failure information procedure. In the SCG failure information procedure, the UE may transmit a SCGFailureInformation message to the first BS to notify that the SCG change failure occurs.

In one example, after the UE successfully configures the SCG configuration, the UE may apply parts of a channel quality indicator (CQI) reporting configuration, a SR configuration and a sounding RS (RS) configuration that do not require the UE to know a single-frequency network (SFN) of the second cell, if any.

In one example, after the UE successfully configures the SCG configuration, the UE may apply part of a measurement configuration and a radio resource configuration that require the UE to know the SFN of the second cell (e.g., measurement gap, periodic CQI reporting, SR configuration, SRS configuration), if any, when acquiring the SFN of the second cell.

In one example, the RRC message or the SCG configuration may include a timing advance value for the UE to adjust a UL transmission timing of the second cell besides indicating no need to perform the RA procedure. In one example, the timing advance value may be included in a medium access control (MAC) control element in a MAC PDU transmitted to the UE by the first BS. The MAC PDU may include the RRC message. The UE uses the timing advance value to adjust the UL transmission timing for transmissions to the second cell.

In one example, the first BS does not transmit the timing advance value. The UE uses a timing advance value received from the first cell before configuring the SCG configuration, to adjust the UL transmission timing. In another example, the first BS does not transmit the timing advance value. The UE adjusts the UL transmission timing for the second cell according to the UL transmission timing for the first cell and a DL timing of the second cell.

In one example, the RRC connection includes a signaling radio bearer (SRB). In one example, the RRC message is a first RRC message (e.g., RRCConnectionReconfiguration), and the RRC complete message is a second RRC message (e.g., RRCConnectionReconfigurationComplete).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling dual connectivity. A communication device can synchronize to a cell of a BS, when a RA procedure is not performed for configuring a SCG configuration. Thus, communications between the communication device and the BS can proceed regularly after the SCG configuration is configured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling dual connectivity, comprising:
    a storage device, for storing instructions of:
        configuring a radio resource control (RRC) connection with a first cell, wherein the first cell belongs to a first base station (BS);
        receiving a RRC message via the RRC connection on the first cell from the first BS, wherein the RRC message configures a secondary cell group (SCG) configuration to the communication device and includes an indication indicating no need to perform a random access (RA) procedure to a second cell indicated in the SCG configuration;
        synchronizing to a downlink (DL) of the second cell, wherein the second cell belongs to a second BS;
        transmitting a RRC complete message to the first cell or a third cell of the first BS in response to the RRC message;
        not performing the RA procedure to the second cell in response to the indication;
        determining that the SCG configuration is successfully configured, when detecting a Radio Network Temporary Identifier (RNTI) on a DL channel from the second cell in a first time period;
        simultaneously connecting to the first BS and the second BS, after successfully configuring the SCG configuration; and
    a processing circuit, coupled to the storage device, configured to execute the instructions stored in the storage device.

2. The communication device of claim 1, wherein the storage device further stores the instructions of:
    starting a first timer for determining whether the first time period is exceeded, when receiving the RRC message; and
    stopping the first timer, when detecting the RNTI on the DL channel from the second cell before the first timer expires.

3. The communication device of claim 1, wherein the storage device further stores the instruction of:
    determining that the SCG configuration is not successfully configured, when the communication device does not detect the RNTI from the second cell in the first time period.

4. The communication device of claim 1, wherein the communication device detects the RNTI on the DL channel by detecting a resource allocation with a cyclic redundancy check (CRC) scrambled by the RNTI on the DL channel.

5. The communication device of claim 4, wherein the resource allocation comprises an uplink (UL) grant or a DL assignment.

6. The communication device of claim 1, wherein the DL channel is a physical DL control channel (PDCCH) or an enhanced PDCCH (E-PDCCH).

7. The communication device of claim 1, wherein the RNTI is a cell RNTI (C-RNTI) of the communication device or a system information RNTI (SI-RNTI).

8. A communication device for handling dual connectivity, comprising:
    a storage device, for storing instructions of:
        configuring a radio resource control (RRC) connection with a first cell, wherein the first cell belongs to a first base station (BS);
        receiving a RRC message via the RRC connection on the first cell from the first BS, wherein the RRC message configures a secondary cell group (SCG) configuration to the communication device and includes an indication indicating no need to perform a random access (RA) procedure to a second cell indicated in the SCG configuration;
        synchronizing to a downlink (DL) of the second cell, wherein the second cell belongs to a second BS;
        transmitting a RRC complete message to the first cell or a third cell of the first BS in response to the RRC message;
        not performing the RA procedure to the second cell in response to the indication;
        determining that the SCG configuration is successfully configured, when the synchronization to the DL of the second cell is completed in a first time period;
        simultaneously connecting to the first BS and the second BS, after successfully configuring the SCG configuration; and
    a processing circuit, coupled to the storage device, configured to execute the instructions stored in the storage device.

9. The communication device of claim 8, wherein the storage device further stores the instructions of:
    starting a first timer for determining whether the first time period is exceeded, when receiving the RRC message; and
    stopping the first timer, when the synchronization to the DL of the second cell is completed before the first timer expires.

10. The communication device of claim 8, wherein the storage device further stores the instruction of:
  determining that the SCG configuration is not successfully configured, when the synchronization to the DL of the second cell is not completed in the first time period.

11. A method for handling dual connectivity for a communication device, comprising:
  configuring a radio resource control (RRC) connection with a first cell, wherein the first cell belongs to a first base station (BS);
  receiving a RRC message via the RRC connection on the first cell from the first BS, wherein the RRC message configures a secondary cell group (SCG) configuration to the communication device and includes an indication indicating no need to perform a random access (RA) procedure to a second cell indicated in the SCG configuration;
  synchronizing to a downlink (DL) of the second cell, wherein the second cell belongs to a second BS;
  transmitting a RRC complete message to the first cell or a third cell of the first BS in response to the RRC message;
  not performing the RA procedure to the second cell in response to the indication; and
  determining that the SCG configuration is successfully configured, when detecting a Radio Network Temporary Identifier (RNTI) on a DL channel from the second cell in a first time period; and
  simultaneously connecting to the first BS and the second BS, after successfully configuring the SCG configuration.

12. The method of claim 11, further comprising:
  starting a first timer for determining whether the first time period is exceeded, when receiving the RRC message; and
  stopping the first timer, when detecting the RNTI on the DL channel from the second cell before the first timer expires.

13. The method of claim 11, further comprising:
  determining that the SCG configuration is not successfully configured, when the communication device does not detect the RNTI from the second cell in the first time period.

14. The method of claim 11, wherein the communication device detects the RNTI on the DL channel by detecting a resource allocation with a cyclic redundancy check (CRC) scrambled by the RNTI on the DL channel.

15. The method of claim 14, wherein the resource allocation comprises an uplink (UL) grant or a DL assignment.

16. The method of claim 11, wherein the DL channel is a physical DL control channel (PDCCH) or an enhanced PDCCH (E-PDCCH).

17. The method of claim 11, wherein the RNTI is a cell RNTI (C-RNTI) of the communication device or a system information RNTI (SI-RNTI).

* * * * *